(12) United States Patent
Mitchell

(10) Patent No.: US 9,718,001 B2
(45) Date of Patent: Aug. 1, 2017

(54) BIOMASS FRACTIONATION AND EXTRACTION METHODS

(71) Applicant: Green Extraction Technologies, Brevard, NC (US)

(72) Inventor: Melvin Mitchell, Penrose, NC (US)

(73) Assignee: Green Extraction Technologies, Brevard, NC (US)

( * ) Notice: Subject to any disclaimer, the term of this patent is extended or adjusted under 35 U.S.C. 154(b) by 81 days.

(21) Appl. No.: 14/620,785

(22) Filed: Feb. 12, 2015

(65) Prior Publication Data

US 2015/0151214 A1 Jun. 4, 2015

Related U.S. Application Data

(62) Division of application No. 14/454,833, filed on Aug. 8, 2014.

(Continued)

(51) Int. Cl.
*B21B 1/02* (2006.01)
*B01D 3/14* (2006.01)
(Continued)

(52) U.S. Cl.
CPC ............... *B01D 3/143* (2013.01); *B01D 3/14* (2013.01); *B01D 11/0238* (2013.01);
(Continued)

(58) Field of Classification Search
CPC .............. B21B 1/02; B21B 1/347; D21D 1/30
See application file for complete search history.

(56) References Cited

U.S. PATENT DOCUMENTS 1,951,519 A 3/1934 Milne
2,226,429 A 12/1940 Hall
(Continued)

FOREIGN PATENT DOCUMENTS

WO WO 92/18691 A1 10/1992
WO WO 2006/111604 A1 10/2006
(Continued)

OTHER PUBLICATIONS

Scott-Thomas "Technology disrupts cell structure for better bioavailability", http://www.nutraingredients-usa.com/Suppliers2/Technology-disrupts . . . 4 pages (2015).
(Continued)

*Primary Examiner* — Liam J Heincer
(74) *Attorney, Agent, or Firm* — F. Michael Sajovec

(57) ABSTRACT

A biomass fractionation apparatus includes a vessel having a processing chamber, an inlet configured to receive a biomass into the processing chamber, and an outlet configured to discharge processed biomass from the chamber. A bed plate is movably positioned within the processing chamber and includes a plurality of elongated fins extending outwardly therefrom in substantially parallel spaced-apart relationship. A cylindrical rotor is rotatably secured within the processing chamber in adjacent, spaced-apart relationship with the bed plate. The rotor has a plurality of elongated blades extending radially outwardly therefrom in circumferentially spaced-apart relationship. Upon rotation of the rotor, the blades are configured to accelerate a biomass within the processing chamber against the fins of the bed plate and to cause the bed plate to pulsate against the rotor.

12 Claims, 9 Drawing Sheets

Related U.S. Application Data

(60) Provisional application No. 61/864,853, filed on Aug. 12, 2013, provisional application No. 61/909,418, filed on Nov. 27, 2013.

(51) Int. Cl.
| | | |
|---|---|---|
| *B01J 19/18* | (2006.01) | |
| *C07G 1/00* | (2011.01) | |
| *D21B 1/02* | (2006.01) | |
| *D21B 1/12* | (2006.01) | |
| *C08B 1/00* | (2006.01) | |
| *B01D 11/02* | (2006.01) | |

(52) U.S. Cl.
CPC ...... *B01D 11/0261* (2013.01); *B01D 11/0273* (2013.01); *B01J 19/18* (2013.01); *C07G 1/00* (2013.01); *C08B 1/003* (2013.01); *D21B 1/02* (2013.01); *D21B 1/12* (2013.01); *B01J 2219/00822* (2013.01)

(56) References Cited

U.S. PATENT DOCUMENTS

| | | | |
|---|---|---|---|
| 2,697,701 A | 12/1954 | Heritage et al. | |
| 2,793,583 A * | 5/1957 | Messing | B30B 9/202 |
| | | | 100/121 |
| 3,174,695 A * | 3/1965 | Fisher | B02C 7/02 |
| | | | 241/146 |
| 3,323,732 A * | 6/1967 | Dalzell, Jr. | D21D 1/30 |
| | | | 241/162 |
| 3,338,416 A | 8/1967 | Barry | |
| 4,253,613 A * | 3/1981 | Reinhall | B02C 7/06 |
| | | | 241/16 |
| 4,269,362 A | 5/1981 | Berggren | |
| 4,396,161 A * | 8/1983 | Ruokolainen | D21D 1/30 |
| | | | 241/245 |
| 4,806,475 A | 2/1989 | Gould | |
| 4,991,720 A | 2/1991 | Höglund et al. | |
| 5,042,726 A * | 8/1991 | Reinhall | B01F 7/00758 |
| | | | 241/259.1 |
| 5,306,392 A | 4/1994 | Mita | |
| 5,398,877 A * | 3/1995 | Xiangzhi | D21D 1/303 |
| | | | 241/163 |
| 5,458,897 A | 10/1995 | Paré | |
| 5,498,766 A | 3/1996 | Stuart et al. | |
| 5,704,559 A | 1/1998 | Fröberg et al. | |
| 5,730,837 A | 3/1998 | Black | |
| 5,813,618 A | 9/1998 | Prew | |
| 5,859,236 A | 1/1999 | Burkart | |
| 6,302,997 B1 | 10/2001 | Hurter et al. | |
| 6,435,433 B1 * | 8/2002 | Hesch | B02C 13/205 |
| | | | 241/186.35 |
| 6,447,815 B1 | 9/2002 | Menon et al. | |
| 6,770,168 B1 | 8/2004 | Stigsson | |
| 7,396,434 B2 | 7/2008 | Rodriguez Rivera et al. | |
| 7,441,717 B1 * | 10/2008 | Majka | B02C 17/166 |
| | | | 241/15 |
| 7,478,773 B2 | 1/2009 | Gingras et al. | |
| 7,504,245 B2 | 3/2009 | Kinley et al. | |
| 7,658,955 B2 | 2/2010 | D'Amelio, Sr. et al. | |
| 7,678,358 B2 | 3/2010 | Eckert et al. | |
| 7,842,161 B2 | 11/2010 | van Heiningen et al. | |
| 7,892,397 B2 | 2/2011 | Luo et al. | |
| 8,013,195 B2 | 9/2011 | McCall et al. | |
| 8,038,840 B2 | 10/2011 | Li | |
| 8,268,125 B2 | 9/2012 | Retsina et al. | |
| 8,404,884 B2 | 3/2013 | Reaney et al. | |
| 8,465,559 B2 | 6/2013 | Guay et al. | |
| 8,475,627 B2 | 7/2013 | van Heiningen et al. | |
| 8,497,091 B2 | 7/2013 | Hanakawa et al. | |
| 8,511,595 B2 | 8/2013 | Lindroos et al. | |
| 8,585,863 B2 | 11/2013 | Retsina et al. | |
| 8,609,379 B2 | 12/2013 | Chheda et al. | |
| 8,636,634 B2 | 1/2014 | Allen et al. | |
| 8,741,632 B2 | 6/2014 | Lee et al. | |
| 8,765,846 B2 | 7/2014 | Balakshin et al. | |
| 8,888,736 B2 * | 11/2014 | Anthony | B01F 7/00766 |
| | | | 424/400 |
| 9,421,477 B2 * | 8/2016 | Mitchell | D21B 1/02 |
| 2002/0132121 A1 | 9/2002 | Palacio et al. | |
| 2002/0148575 A1 | 10/2002 | Wingerson | |
| 2004/0138445 A1 | 7/2004 | Thorre | |
| 2006/0147556 A1 | 7/2006 | Brewer | |
| 2007/0084952 A1 * | 4/2007 | Sjostrom | B02C 7/12 |
| | | | 241/261.2 |
| 2007/0125891 A1 * | 6/2007 | Crossley | D21D 1/30 |
| | | | 241/30 |
| 2007/0128236 A1 | 6/2007 | Erskine | |
| 2008/0029233 A1 | 2/2008 | Wingerson et al. | |
| 2008/0032344 A1 | 2/2008 | Fallavollita | |
| 2008/0085356 A1 * | 4/2008 | Colliver | A23F 3/12 |
| | | | 426/597 |
| 2008/0295980 A1 | 12/2008 | Hallberg et al. | |
| 2008/0317661 A1 | 12/2008 | Eckert et al. | |
| 2010/0059609 A1 | 3/2010 | Teeter, Jr. et al. | |
| 2010/0119469 A1 | 5/2010 | Wu et al. | |
| 2010/0167339 A1 | 7/2010 | Clayton et al. | |
| 2010/0325947 A1 | 12/2010 | Ohman et al. | |
| 2011/0003370 A1 | 1/2011 | Gordon et al. | |
| 2011/0100359 A1 | 5/2011 | North | |
| 2011/0245444 A1 | 10/2011 | Miller et al. | |
| 2011/0262618 A1 * | 10/2011 | Melwitz | A23L 19/09 |
| | | | 426/638 |
| 2011/0262985 A1 * | 10/2011 | Medoff | C12P 19/14 |
| | | | 435/165 |
| 2011/0270156 A1 * | 11/2011 | Hassan | B01F 7/00766 |
| | | | 604/24 |
| 2011/0313141 A1 | 12/2011 | Brooks | |
| 2012/0108798 A1 | 5/2012 | Wenger et al. | |
| 2012/0197052 A1 | 8/2012 | Matthews | |
| 2012/0282383 A1 | 11/2012 | Hassan et al. | |
| 2013/0005952 A1 | 1/2013 | Belanger et al. | |
| 2013/0202905 A1 | 8/2013 | Blount | |
| 2013/0213245 A1 | 8/2013 | Henderson et al. | |
| 2013/0216520 A9 | 8/2013 | Medoff | |
| 2013/0224816 A1 | 8/2013 | Elliott et al. | |
| 2013/0225855 A1 | 8/2013 | Ryba et al. | |
| 2013/0225856 A1 | 8/2013 | Ryba et al. | |
| 2013/0288307 A1 | 10/2013 | Medoff | |
| 2014/0024093 A1 | 1/2014 | Blackbourn et al. | |
| 2014/0045226 A1 | 2/2014 | Wicking et al. | |
| 2014/0096830 A1 | 4/2014 | Gastaldo et al. | |
| 2014/0107353 A1 | 4/2014 | Qiao et al. | |
| 2014/0121359 A1 | 5/2014 | Thies et al. | |
| 2014/0135470 A1 | 5/2014 | Murray et al. | |
| 2014/0174680 A1 | 6/2014 | Hawkins et al. | |
| 2014/0182801 A1 | 7/2014 | Hawkins et al. | |
| 2014/0190471 A1 | 7/2014 | Zhang | |
| 2014/0196715 A1 | 7/2014 | Torres et al. | |
| 2014/0227742 A1 | 8/2014 | Bao et al. | |
| 2015/0041082 A1 * | 2/2015 | Mitchell | D21B 1/02 |
| | | | 162/14 |
| 2015/0044306 A1 * | 2/2015 | Mitchell | A61K 36/00 |
| | | | 424/728 |
| 2015/0045543 A1 * | 2/2015 | Mitchell | C08H 6/00 |
| | | | 530/500 |
| 2015/0045544 A1 * | 2/2015 | Mitchell | D21B 1/02 |
| | | | 530/507 |
| 2015/0152598 A1 * | 6/2015 | Mitchell | C08H 6/00 |
| | | | 162/56 |
| 2015/0247009 A1 * | 9/2015 | Mitchell | C08H 6/00 |
| | | | 525/450 |

FOREIGN PATENT DOCUMENTS

| | | | |
|---|---|---|---|
| WO | WO 2010/058185 A1 | 5/2010 | |
| WO | WO 2010/075594 A2 | 7/2010 | |
| WO | WO 2013/144453 A1 | 10/2013 | |
| WO | WO 2013/185344 A1 | 12/2013 | |
| WO | WO 2014/046543 A1 | 3/2014 | |

(56) References Cited

FOREIGN PATENT DOCUMENTS

OTHER PUBLICATIONS

Du et al., "Universal fractionation of lignin-carbohydrate complexes (LCCs) from lignocellulosic biomass: an example using spruce wood," Plant J., Apr. 2013, vol. 74, No. 2, 23 pages.

Li et al., "Fractionation and characterization of lignin-carbohydrate complexes (LCCs) from eucalyptus fibers," Holzforschung, Nov. 2010, vol. 65, No. 1, Abstract, 2 pages.

Banerjee et al. "Alkaline peroxide pretreatment of corn stover: effects of biomass, peroxide, and enzyme loading and composition on yields of glucose and xylose", *Biotechnology for Biofuels* 4(16):1-15 (2011).

Banerjee et al. "Scale-Up and Integration of Alkaline Hydrogen Peroxide Pretreatment, Enzymatic Hydrolysis, and Ethanolic Fermentation", *Biotechnology and Bioengineering* 109(4):922-931 (2012).

Kim et al. "Front-end recovery of protein from lignocellulosic biomass and its effects on chemical pretreatment and enzymatic saccharification", *Bioprocess Biosyst Eng.* 36:687-694 (2013).

Sun et al. "Production and extraction of sugars from switchgrass hydrolyzed in ionic liquids", *Biotechnology for Biofuels* 6(39):1-14 (2013).

Xu et al. "Delignification of Switchgrass Cultivars for Bioethanol Production", *BioResources* 6(1):707-720 (2011).

Notification of Transmittal of the International Search Report and the Written Opinion of the International Searching Authority, or the Declaration corresponding to International Application No. PCT/US2014/050542 mailed Nov. 14, 2014.

Notification of Transmittal of the International Search Report and the Written Opinion of the International Searching Authority, or the Declaration corresponding to International Application No. PCT/US2014/050536 mailed Nov. 14, 2014.

Notification of Transmittal of the International Search Report and the Written Opinion of the International Searching Authority, or the Declaration corresponding to International Application No. PCT/US2014/050529 mailed Nov. 13, 2014.

Notification of Transmittal of the International Search Report and the Written Opinion of the International Searching Authority, or the Declaration corresponding to International Application No. PCT/US2014/050531 mailed Nov. 13, 2014.

Bozell, J. et al., Clean Fractionation of Biomass, U.S. Department of Energy by the National Renewable Energy Laboratory.

Li, J. et al., Fractionation and Characterization of Lignon-Carbohydrate Complexes (LCCS) From Eucalyptus Fibers. *Holzforschung*. Nov. 2010, vol. 65; pp. 43-50.

Notification of Transmittal of the International Search Report and the Written Opinion of the International Searching Authority, or the Declaration corresponding to International Application No. PCT/US2015/15378 mailed May 14, 2015.

Notification of Transmittal of the International Search Report and the Written Opinion of the International Searching Authority, or the Declaration corresponding to International Application No. PCT/US2015/15368 mailed May 18, 2015.

\* cited by examiner

BIOMASS FRACTIONATION AND EXTRACTION METHODS

RELATED APPLICATION

This application is a divisional application of U.S. application Ser. No. 14/454,833, filed Aug. 8, 2014, which claims the benefit of and priority to U.S. Provisional Patent Application No. 61/864,853 filed Aug. 12, 2013, and U.S. Provisional Patent Application No. 61/909,418 filed Nov. 27, 2013, the disclosures of which are incorporated herein by reference as if set forth in their entireties.

FIELD OF THE INVENTION

The present invention relates generally to biomass and, more particularly, to biomass processing.

BACKGROUND

Natural cellulosic feedstocks are typically referred to as "biomass". Many types of biomass, including wood, paper, agricultural residues, herbaceous crops, and lignocellulosic municipal and industrial solid wastes have been considered as feedstocks for the production and preparation of a wide range of goods. Plant biomass materials are comprised primarily of cellulose, hemicellulose, other sugars, and lignin, bound together in a complex gel-like structure along with amounts of extractives, pectins, proteins and ash. Thus, successful commercial use of biomass as a feedstock or its components directly may depend on the separation of the various constituents.

Many steps are often required in production, harvesting, storage, transporting, and processing of biomass to yield useful products. One step in the processing is the separation, or fractionation, of biomass into its major components: extractives, hemicellulose, lignin, other sugars, and cellulose. Many approaches have been investigated for disentangling this complex structure. Once this separation has been achieved, a variety of paths are opened for further processing of each component into marketable products. For example, the possibility of producing products such as biofuels, polymers and latex replacements from biomass has recently received much attention. This attention is due to the availability of large amounts of cellulosic feedstock, the need to reduce burning or landfilling of waste cellulosic materials, and the usefulness of sugar and cellulose as raw materials substituting for oil-based products. Other biomass constituents, such as isolated extractives and lignins from the biomass, may also have potential market value.

The difficulty is efficiently and in an environmentally friendly manner separating the components from each other. Thus there continues to be a need for improved systems and methods for separating solid biomass into its constituent components that take into consideration factors such as environmental and energy concerns, efficiency and cost-effectiveness.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a biomass fractionation apparatus includes a vessel having a processing chamber, an inlet configured to receive biomass into the processing chamber, and an outlet configured to discharge processed biomass from the chamber. A cylindrical rotor is rotatably secured within the processing chamber, and a motor is operably connected to the rotor and is configured to rotate the rotor. A bed plate is movably positioned within the processing chamber adjacent to the rotor. A pump is in fluid communication with the vessel inlet, for example via tubing, and is configured to feed biomass into the processing chamber. In some embodiments, the pump is configured to feed the biomass into the processing chamber at a rate of between about 10 gallons per minute (gpm) and about 20 gpm.

The rotor has a plurality of elongated blades extending radially outwardly therefrom in circumferentially spaced-apart relationship. Each rotor blade has a longitudinal direction that is substantially parallel with the rotational axis of the rotor. The bed plate includes a plurality of elongated fins extending outwardly therefrom in substantially parallel spaced-apart relationship. A biasing mechanism is configured to urge the bed plate towards the rotor against an opposite force caused by the biomass flowing through the processing chamber between the rotor and the bed plate.

In some embodiments, the biasing mechanism includes a counterweight located external to the vessel. The counterweight is connected to the bed plate via one or more articulating linkages. In other embodiments, the biasing mechanism may include at least one pneumatic cylinder, at least one spring, etc.

Upon rotation of the rotor via the motor, the rotor blades are configured to accelerate the biomass within the processing chamber against the fins of the bed plate. The force of the biomass against the bed plate and the opposite force of the biasing mechanism against the bed plate causes the bed plate to pulsate rapidly against the rotor with the biomass therebetween.

In some embodiments, each rotor blade has a substantially rectangular cross-sectional configuration. In some embodiments, each rotor blade has a width of about 0.375 inch. In some embodiments, each rotor blade has a distal free end that is spaced from the rotor by about 0.50 inch. Rotation of the rotor blades relative to the bed plate fins causes the biomass within the vessel to accelerate from about 4 feet per second (fps) to about 40 fps.

In some embodiments, a longitudinal direction defined by each bed plate fin is skewed relative to a longitudinal direction defined by each rotor blade. This prevents the rotor blades and bed plate fins from becoming engaged (i.e., interdigitated) which may damage the apparatus. In some embodiments, each bed plate fin has a distal free end with an arcuate configuration.

In some embodiments, the vessel inlet is located above the rotor and is oriented at an angle that is transverse to a rotational axis of the rotor. In some embodiments, the vessel outlet is positioned adjacent to the bed plate.

The processing chamber may be formed from various materials including, but not limited to, carbon and alloy steel, stainless steel, cast iron, brass, copper and polymeric materials. Similarly, the bed plate may be formed from various materials including, but not limited to, carbon and alloy steel, brass, stainless steel, cast iron, and polymeric materials. The rotor may be formed from various materials including, but not limited to, carbon and alloy steel, stainless steel, cast iron, brass, copper and polymeric materials.

According to some embodiments of the present invention, a method for fractionating biomass includes a pretreatment step wherein the biomass is converted to a fluidized or flowable form and may include chopping, cutting, attrition, crushing, or the like, and/or contact with a solvent (e.g., ethanol, aqueous ethanol, water, short chain alcohol, glycerin, or any combination thereof, etc.), for example, to produce a fluidized biomass; and subjecting the fluidized biomass to pulse and shear forces within a processing chamber while avoiding denaturing the individual components to produce a first fraction and a fractionated biomass. An exemplary fraction is a component such as lignin, extractives, pectins, cellulose, sugars, fibers, proteins and hemicellulose, or any combination thereof.

The processing chamber includes a cylindrical rotor having a plurality of elongated blades extending radially outwardly therefrom in circumferentially spaced-apart relationship, and a bed plate movably positioned within the processing chamber adjacent the rotor. The bed plate includes a plurality of elongated fins extending outwardly therefrom in substantially parallel spaced-apart relationship. The rotor is rotated to accelerate the fluidized biomass against the fins of the bed plate and to cause the bed plate to pulsate against the rotor with the fluidized biomass therebetween. For example, in some embodiments, the rotor may be rotated such that the bed plate pulsates against the rotor at a frequency of at least 1000 pulses per second.

In some embodiments, the fractionated biomass is subjected to a compression force while in contact with additional solvent to provide a second fraction separated from the previously fractionated biomass and then the first fraction and the second fraction may be combined together, further separated in combined form or separated apart from each other. The combination of the first fraction and the second fraction may be filtered to remove any solid materials therefrom.

In some embodiments, each of the steps is conducted at ambient temperature.

According to other embodiments of the present invention, a biomass fractionation system includes a biomass fiber disassembly station, a fractionation apparatus, a press, and a screen. The fiber disassembly station is configured to provide a fluidized biomass wherein the fibers have been mechanically disassembled while maintaining the overall chemistries of each of the fiber components. The fractionation apparatus is configured to subject the fluidized biomass to shear forces and pulsation within a processing chamber while avoiding denaturing the individual components to produce a first fraction and a fractionated biomass. The processing chamber includes a cylindrical rotor having a plurality of elongated blades extending radially outwardly therefrom in circumferentially spaced-apart relationship, and a bed plate movably positioned within the processing chamber adjacent the rotor. The bed plate includes a plurality of elongated fins extending outwardly therefrom in substantially parallel spaced-apart relationship. The rotor is rotated in a manner to accelerate the biomass against the fins of the bed plate and to cause the bed plate to pulsate against the rotor with the biomass therebetween. The press is configured to subject the fractionated biomass to a compression force while in contact with additional solvent to provide a second fraction separated from the previously fractionated biomass. The screen is configured to filter the combination of the first fraction and the second fraction to remove any solid materials, particularly fiber fragments. The biomass fractionation system may also include a separator (e.g., membranes, etc.) for separating each of the components. For example, in some embodiments, the separator is configured to separate the fractionated biomass into two or more product streams, such as a lignin/extractives product stream and a sugars/hemicellulose product stream, etc.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate some exemplary embodiments. The drawings and description together serve to fully explain the exemplary embodiments.

DETAILED DESCRIPTION

Figure 1:
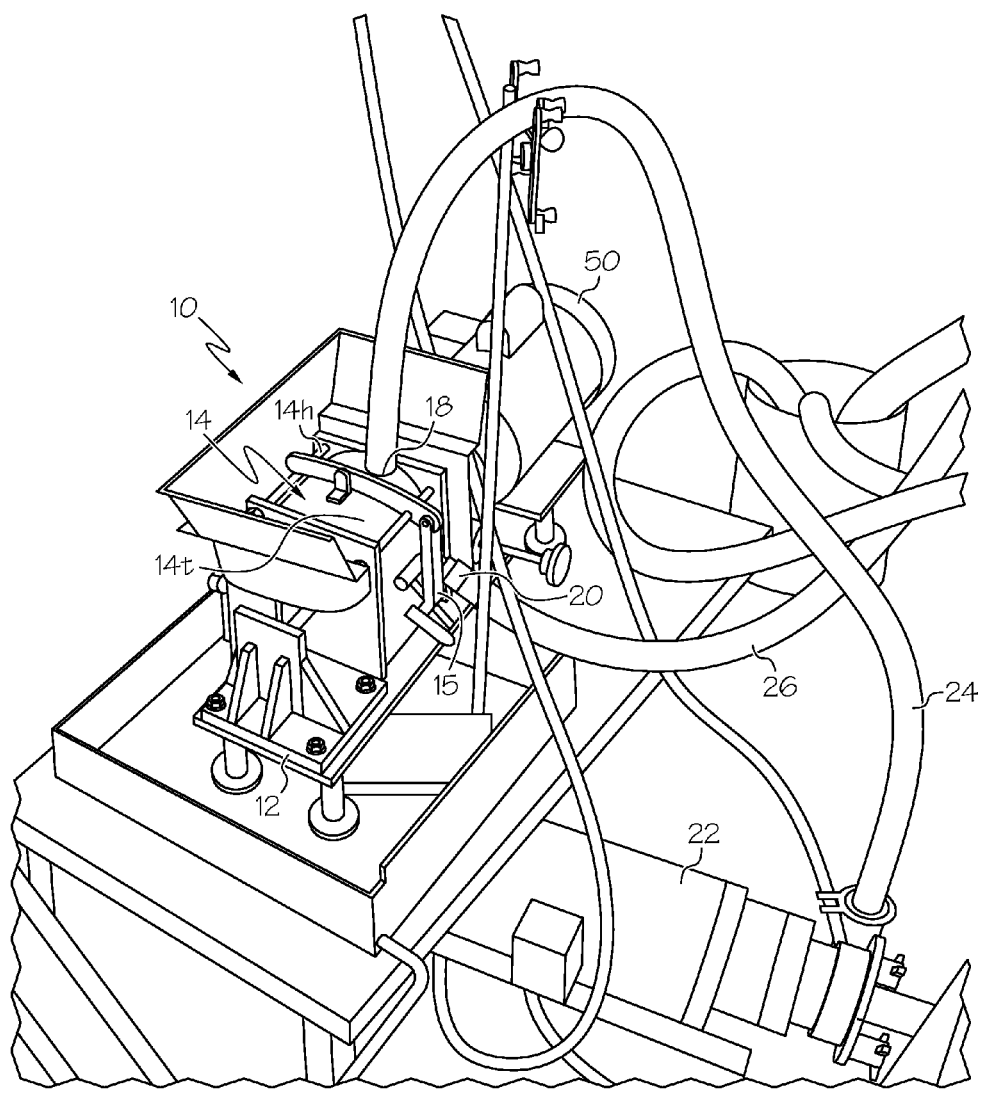
FIG. 1 is a top perspective view of a biomass fractionation apparatus, according to some embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines may illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

As used herein, the term "and/or" includes any and all combinations of one or more of the associated listed items and may be abbreviated as "/".

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "about", as used herein with respect to a value or number, means that the value or number can vary by +/−20%, 10%, 5%, 1%, 0.5%, or even 0.1%.

The term "biomass" includes any non-fossilized, i.e., renewable, organic matter. Types of biomass include, but are not limited to, plant biomass, animal biomass (any animal by-product, animal waste, etc.) and municipal waste biomass (residential and light commercial refuse with recyclables such as metal and glass removed).

The term "fluidized", as used herein with respect to biomass, means causing a biomass to acquire the characteristics of a fluid by suspending the disassembled fibers in air, gas, or liquid.

The term "plant biomass" or "ligno-cellulosic biomass" includes virtually any plant-derived organic matter (woody or non-woody) available for energy on a sustainable basis. "Plant-derived" necessarily includes both sexually reproductive plant parts involved in the production of seed (e.g., flower buds, flowers, fruit and seeds) and vegetative parts (e.g., leaves, roots, leaf buds and stems). Plant biomass can include, but is not limited to, agricultural crop wastes and residues such as corn stover, wheat straw, rice straw, sugar cane bagasse, flax, hemp, oat straw, esparto, kenaf, and the like. Plant biomass further includes, but is not limited to, woody energy crops, wood wastes and residues such as trees, softwood forest thinnings, barky wastes, sawdust, paper and pulp industry waste streams, wood fiber, herbal plant material and the like. Additionally grass crops, such as switchgrass, wheat grass and the like have the potential to be produced in large-scale amounts and to provide a significant source of another plant biomass. For urban areas, a potential plant biomass feedstock comprises yard waste (e.g., grass clippings, leaves, tree clippings, brush, etc.) and vegetable processing waste.

The components of the biomass may include, but are not limited to, lignin, extractives for use as pharmaceuticals or nutraceuticals, cellulose, hemicellulose, other sugars, pectins, proteins, fibers, and other materials obtained from the leaves, stems, flowers, buds, roots, tubers, seeds, fruit and the like of a plant. It is noted that specific biomasses may be higher in such components. For example, woody and grassy biomasses are high in hemicelluloses, cellulose, sugars, and lignins. Herbal materials are high in extractives. Leaf buds and flowers are high in protein.

"Ambient to slightly elevated temperature" includes the temperature of the surroundings in which embodiments of the present invention take place. Ambient to slightly elevated temperature may include, but is not limited to, "room temperature," and temperatures within the range of about 10° C. to about 100° C. (64° F. to 212° F.).

"Alcohol" includes, but is not limited to, methanol, ethanol, isopropanol, propanol, isobutanol and butanol. A "short chain alcohol" generally includes C1 to C4 alcohols.

"Water" includes, but is not limited to, deionized water, spring water, distilled water, tap water and well water, and mixtures thereof.

Figure 2:
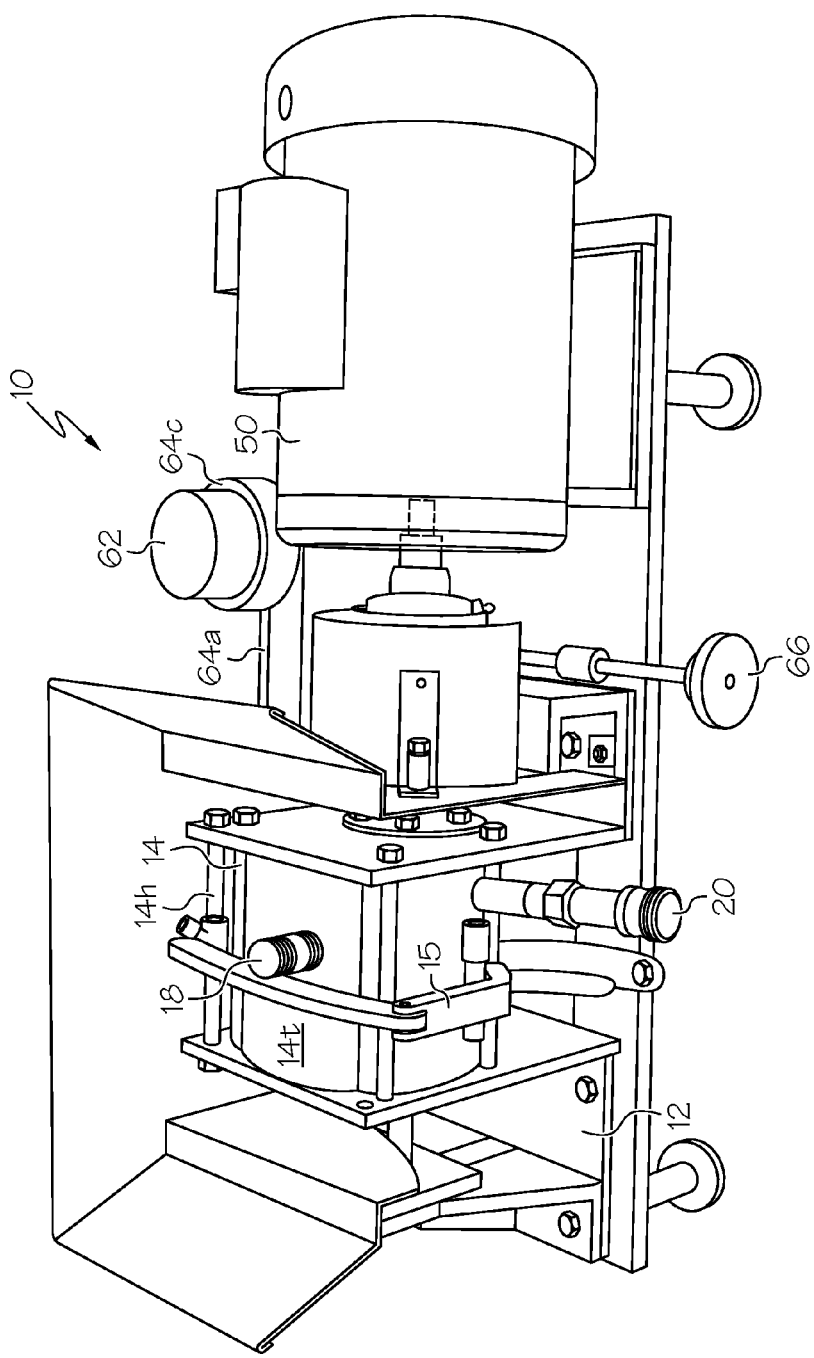
FIG. 2 is a top perspective view of the apparatus of FIG. 1 with the biomass inlet and outlet hoses removed.
Figure 3:
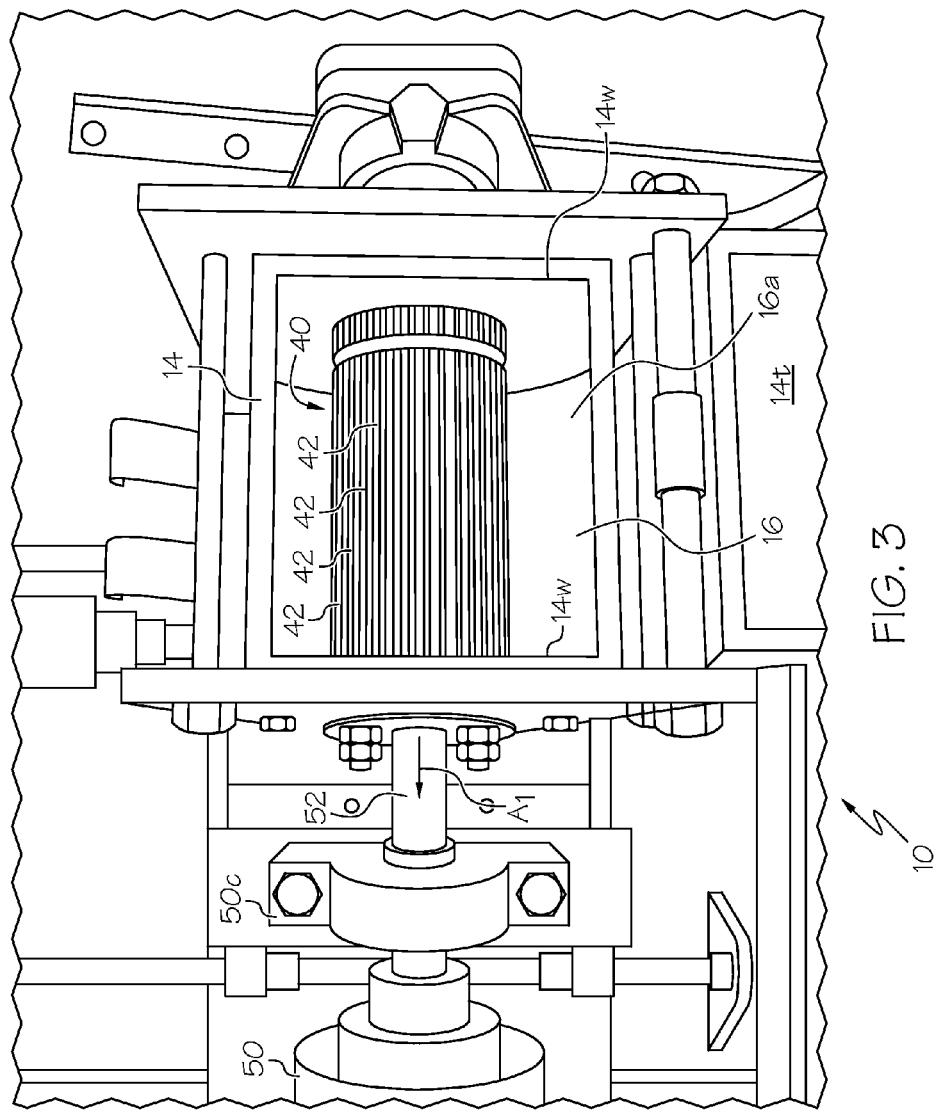
FIG. 3 is a top view of the apparatus of FIG. 1 with the vessel top in an open position to illustrate the processing chamber and the rotor rotatably secured therewithin, according to some embodiments of the present invention.
Figure 10:
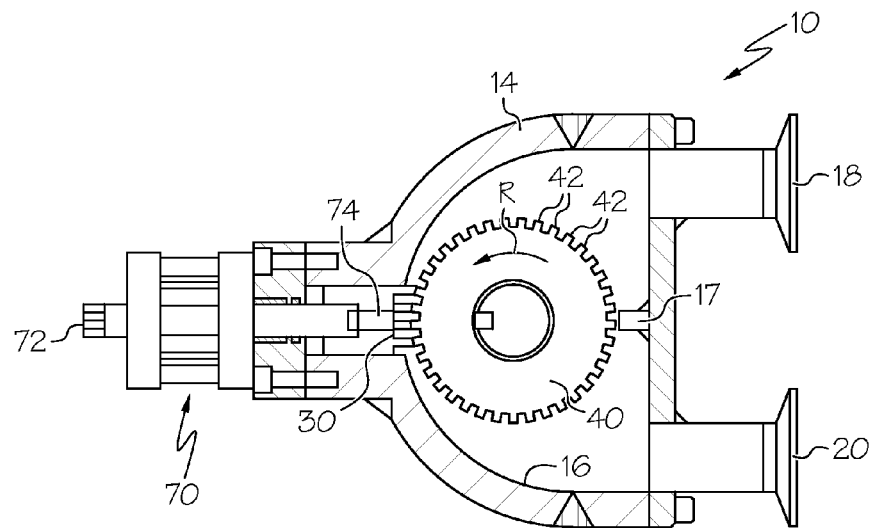
FIG. 10 is a cross-sectional view of the biomass fractionation apparatus of FIG. 9 taken along lines 10-10.
Figure 11:
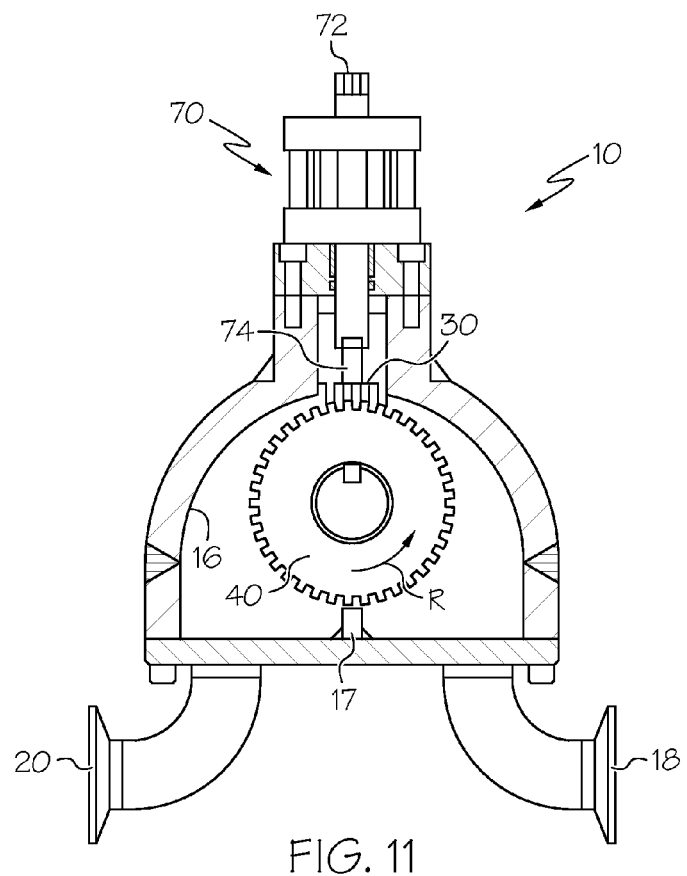
FIG. 11 is a cross-sectional view of a biomass fractionation apparatus according to other embodiments of the present invention.

Referring to FIGS. 1-3, a biomass fractionation apparatus 10, according to some embodiments of the present invention, is illustrated. The illustrated apparatus 10 includes a frame 12 that supports a vessel 14. The vessel 14 has a processing chamber 16 (FIG. 3) with an inlet 18 configured to receive a biomass into the processing chamber 16, and an outlet 20 configured to discharge processed biomass from the chamber 16. In the illustrated embodiment, the inlet 18 is located above the rotor (40, FIG. 3) within the processing chamber 16 and may be oriented at an angle that is transverse to the rotational axis $A_1$ (FIG. 3) of the rotor 40. In the illustrated embodiment, the processing chamber 16 has a volume of about two (2) quarts. However, embodiments of the present invention are not limited to the processing chamber 16 having any particular size or volume. Moreover, the vessel 14 may have various shapes and configurations and the inlet and outlet 18, 20 nozzles may have different orientations, for example as illustrated in FIGS. 10-12.

The illustrated vessel 14 includes a top 14t that is pivotably secured to the vessel 14 via a hinge 14h and is movable between open (FIG. 3) and closed positions (FIGS. 1 and 2). The top 14t is maintained in a closed position during biomass processing via locking device 15. Various types of locking devices may be utilized and embodiments of the present invention are not limited to the illustrated locking device 15. For example, in other embodiments, the vessel 14 may include a top that is secured thereto via fasteners, etc.

A fluidized biomass is pumped into the processing chamber 16 via a pump 22 that is in fluid communication with the vessel inlet 18 via a hose 24. The fluidized biomass is subjected to fractionation within the processing chamber 16, as will be described below, and exits the processing chamber 16 via the vessel outlet 20. The fractionated biomass leaving the processing chamber 16 is directed to a tank or to further downstream processing via a hose 26 connected to the vessel outlet 20.

In some embodiments, the pump 22 is configured to feed a fluidized biomass into the processing chamber 16 at a rate of between about 10 gallons per minute (gpm) and about 20 gpm. However, other feed rates may be utilized. An exemplary pump is a pharmaceutical Fristam pump, available from Fristam Pumps USA, Middleton, Wis. However, various types of pumps may be utilized in accordance with embodiments of the present invention.

Referring to FIG. 3, the top 14t of the vessel 14 has been pivoted to an open position to reveal the processing chamber 16 and an elongated, cylindrical rotor 40 rotatably secured therewithin. The illustrated processing chamber 16 has a generally arcuate internal wall 16a which facilitates the flow of a fluidized biomass through the chamber 16 during processing. The rotor 40 is secured to a shaft 52 and the shaft 52 is rotatably secured to opposite end walls 14w of the vessel via bearings, as would be understood by one skilled in the art. The shaft 52 is connected to a motor 50 via a coupling device 50C, as would be understood by one skilled in the art of the present invention. Exemplary coupling devices that may be utilized include flex couplings manufactured by Lovejoy, Inc., Downers Grove, Ill. In some embodiments, the motor 50 is configured to rotate the rotor 40 up to about 1,500 rotations per minute (rpm). However, embodiments are not limited to any particular motor size or rpm range. Moreover, the motor 50 may be a fixed or variable speed motor.

As will be described further below, an elongated bed plate 30 (FIGS. 4-6) is movably positioned within the processing chamber 16 beneath the rotor 40. The bed plate 30 has a length that is substantially the same length of the rotor 40. However, other lengths are possible, including lengths greater or lesser than the length of the rotor 40. The processing chamber 16 includes an elongated opening 16b (FIG. 4) formed in the bottom thereof and the bed plate 30 is movably and sealably positioned within the opening 16b. As will be described below, the bedplate 30 is configured to pulse rapidly against the rotor 40 as the rotor 40 is rotated via the motor 50 and a fluidized biomass is pumped into the chamber 16 via the pump 22. A seal (not shown) prevents the biomass being processed within the processing chamber 16 from leaking out of the chamber 16 around the bed plate 30.

Figure 4:
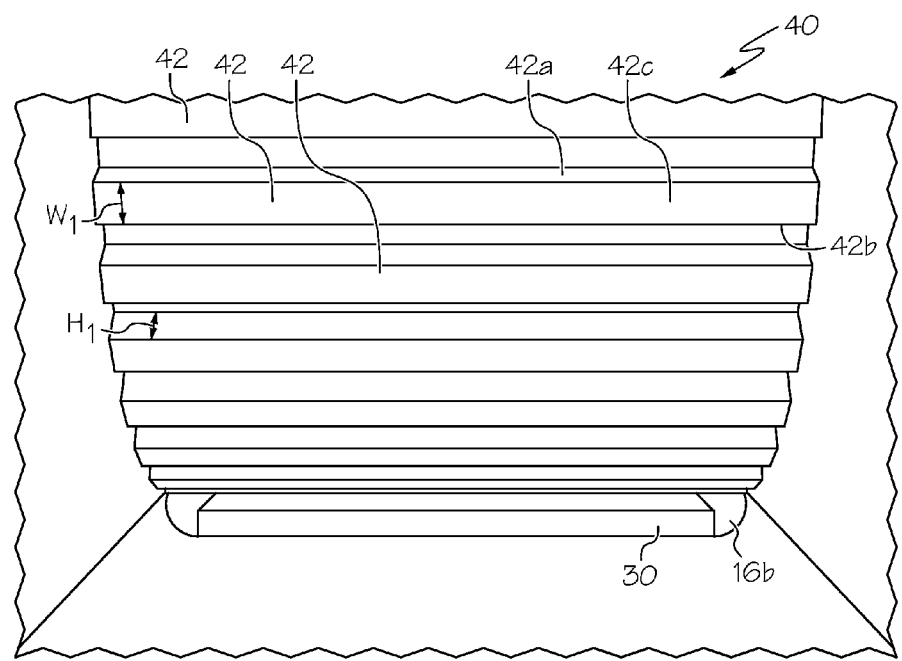
FIG. 4 is a partial view of the rotor and bed plate within the processing chamber of FIG. 3.
Figure 7:
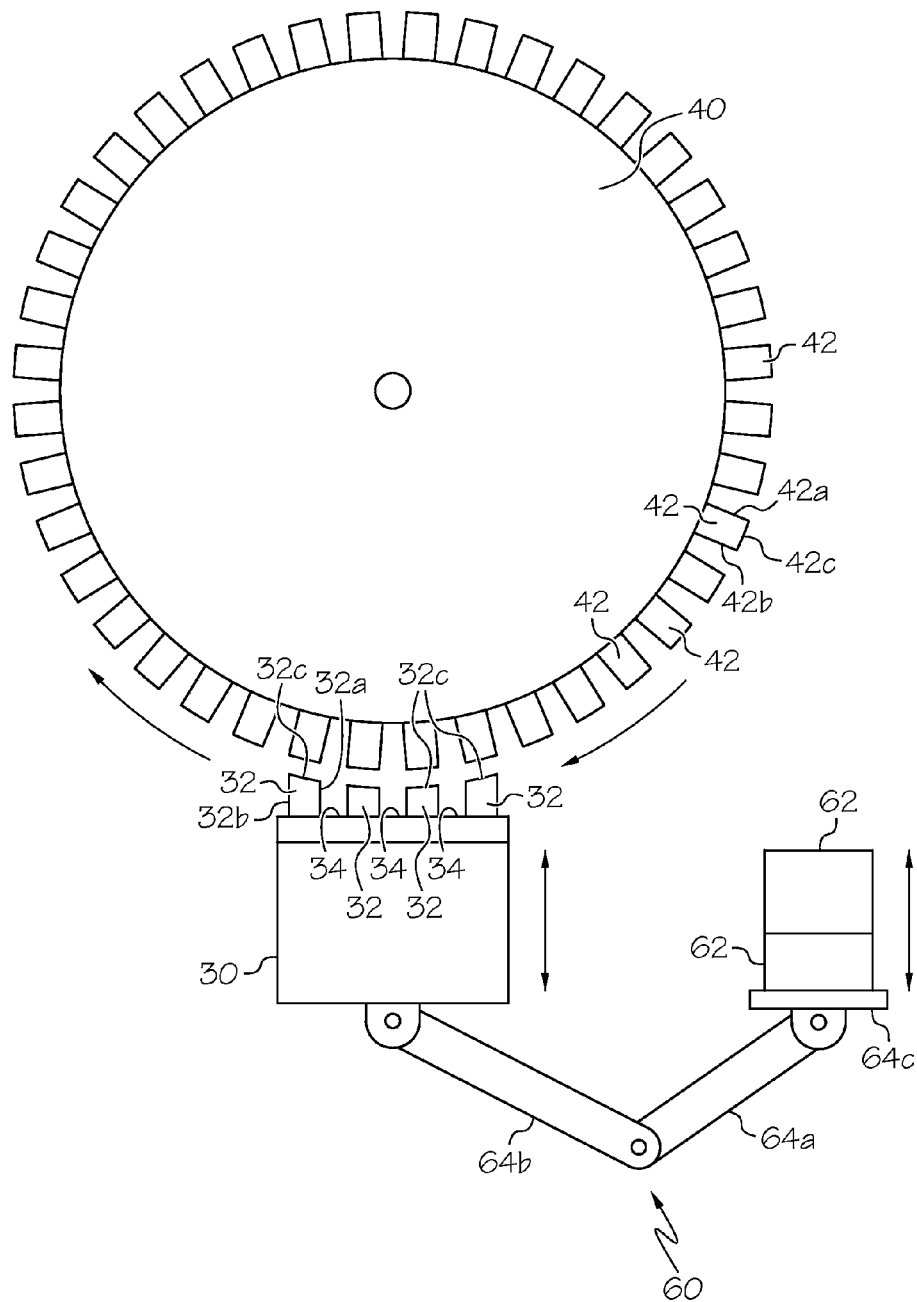
FIG. 7 schematically illustrates the rotor, the bed plate, and a biasing mechanism according to some embodiments of the present invention.

In the illustrated embodiment, the rotor 40 includes a plurality of elongated blades 42 that extend radially outwardly in circumferentially spaced-apart relationship. The rotational axis of the rotor 40 defines an axial direction $A_1$ (FIG. 3). Each rotor blade 42 is elongated in a direction that is substantially parallel with direction $A_1$. In addition, each illustrated rotor blade 42 has a substantially rectangular cross-sectional configuration with generally parallel opposing side walls 42a, 42b, and a distal free end 42c (FIGS. 4, 7). In some embodiments, each elongated blade 42 has a width $W_1$ (FIG. 4) of about 0.375 inch, and each rotor blade has a height $H_1$ (FIG. 4) of about 0.50 inch. In the illustrated embodiment, the rotor 40 has a diameter of about 8.0 inches and a length of about 6.0 inches. The illustrated rotor 40 includes thirty two (32) blades extending radially outwardly in circumferentially spaced-apart relationship. However, embodiments of the present invention are not limited to any particular number of blades 42 or to any particular dimensions of the rotor 40 or blades 42. Moreover, the rotor blades 42 may have other shapes and configurations and are not limited to the illustrated shape and configuration.

Figure 5:
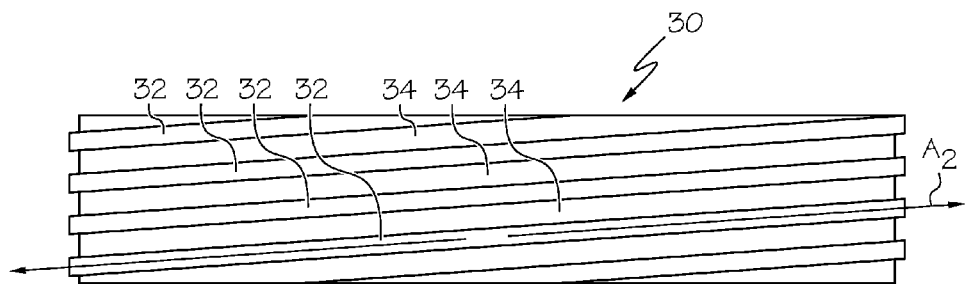
FIG. 5 is a top plan view of the bed plate within the processing chamber of the apparatus of FIG. 1.
Figure 6:
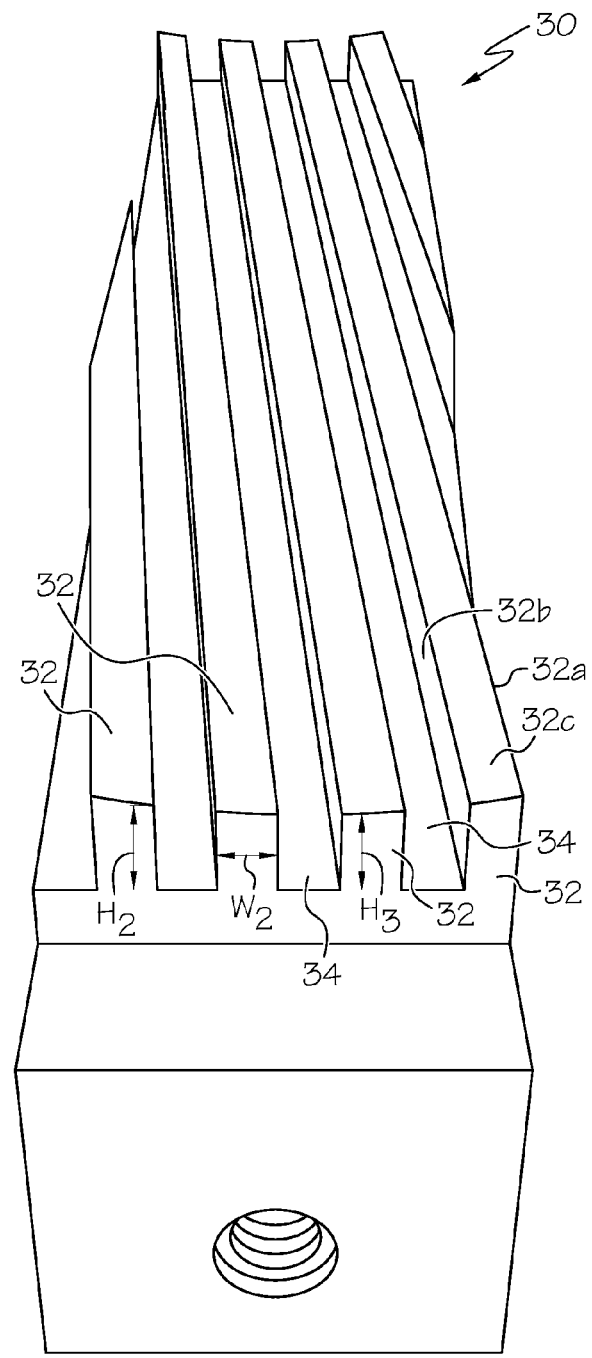
FIG. 6 is a top side perspective view of the bed plate of FIG. 5.

Referring to FIGS. 5 and 6, the illustrated bed plate 30 includes a plurality of elongated fins 32 in substantially parallel spaced-apart relationship. Each pair of adjacent fins 32 defines a respective slot 34. In the illustrated embodiment, each fin 32 has generally parallel opposing side walls 32a, 32b, and an arcuate distal free end 32c. In some embodiments, each elongated fin has a width $W_2$ (FIG. 4) of about ¼ inch. As illustrated in FIG. 6, the height $H_2$ of the outermost fins 32 is greater than the height $H_3$ of the inner two fins 32. The difference in height of the fins 32 along with the arcuate distal ends 32c allows each rotor blade distal end 42c to be spaced apart from each fin distal free end 32c by about the same amount during rotation of the rotor 40, as illustrated in FIG. 7.

The bed plate 30 is movably positioned within the processing chamber and can move back and forth (i.e., float) relative to the rotor 40 as a biomass is accelerated against the fins 32 thereof. For example, in the illustrated embodiment, the bed plate 30 moves up and down relative to the rotor 40. A biasing mechanism 60 is operably associated with the bed plate 30 and is configured to urge the bed plate 30 towards the rotor 40 against an opposite force caused by the biomass being pumped through the processing chamber 16. In the illustrated embodiment, the biasing mechanism 60 includes one or more counterweights 62 that are connected to the bed plate via articulating linkages 64a, 64b. In the illustrated embodiment, the one or more counterweights 62 are located external to the vessel 14 (FIG. 2) and are placed on a platform 64c that is connected to the bed plate 30 via linkages 64a, 64b.

A locking mechanism 66 is provided in the illustrated embodiment to disengage the biasing mechanism 60 from the bed plate 30 during non-operational times.

However, embodiments of the present invention are not limited to the illustrated configuration of the linkages 64a, 64b and the counterweight platform 64c. For example, a single arm may be used to connect platform 64c to the bed plate.

Embodiments of the present invention are not limited to the illustrated biasing mechanism 60. Other ways of urging the bed plate 30 towards the rotor 40 against an opposite force caused by a biomass being pumped through the processing chamber 16 may be utilized. For example, in some embodiments, one or more springs may be operably associated with the bed plate 30 to urge the bed plate 30 towards the rotor 40. In other embodiments, as illustrated in FIGS. 10-12, a biasing mechanism may include one or more pneumatic (or other fluid actuated) cylinders 70 that are configured to urge the bed plate 30 towards the rotor 40.

As illustrated in FIG. 5, the elongated bed plate fins 32 extend along a direction $A_2$. The bed plate 30 and rotor 40 are positioned within the processing chamber 16 such that direction $A_2$ is skewed or transverse to the direction $A_1$ (i.e., the rotational axis of the rotor 40 and the longitudinal direction defined by each of the rotor blades 42). The skewed orientation of the bed plate fins 32 relative to the rotor blades 42 prevents the rotor blades 42 from becoming stuck in the slots 34 between the bed plate fins 32 (i.e., interdigitated), which may damage the rotor 40 and/or the bed plate 30.

In operation, a biomass typically has a residence time within the processing chamber 16 of between about 1.5-3.0 seconds. However, the residence time can be varied by adjusting the biomass flow rate via the pump 22. In this amount of time, the rotor 40 will cause the bed plate to pulsate relative to the rotor between about 900 and about 3600 times inside the processing chamber 16. These pulsations and the rapid acceleration of the biomass, for example, from about 4.0 feet per second (fps)-8.0 fps in the inlet hose 24 to about 40 fps in the processing chamber 16, cause the cellular structure of the biomass to release its components without denaturing or altering the chemistry of the individual components, namely fractionation into each of the various components.

In some embodiments of the present invention, the processing chamber inner surface 16a may be formed of materials such as carbon and alloy steel, brass, stainless steel, cast iron, and polymeric materials. In some embodiments of the present invention, the rotor 40 and rotor blades 42 may be formed of materials such as carbon and alloy steel, stainless steel, cast iron, brass, copper, and polymeric materials. Similarly, in some embodiments of the present invention, the bed plate 30 and bed plate fins 32 may be formed of materials such as carbon and alloy steel, stainless steel, cast iron, brass, copper, and polymeric materials.

Referring now to FIGS. 10-12, fractionation apparatus 10 according to other embodiments of the present invention are illustrated. Referring initially to FIGS. 10 and 11, the illustrated fractionation apparatus 10 includes a vessel 14 having a processing chamber 16 and a rotor 40 rotatably secured therewithin, as described above. The rotor 40 is secured to a shaft 52 and the shaft 52 is rotatably secured to the vessel 14 via bearings 53. In addition, sealing glands 54 (e.g., Teflon® brand sealing glands, etc.) are provided around the shaft 52 on both sides of the vessel 14 to prevent leakage of biomass from the processing chamber via the openings in the vessel 14 for the shaft 52.

In the illustrated embodiment, a pair of pneumatic cylinders 70 are provided that serve as a biasing mechanism to urge the bed plate 30 towards the rotor 40 and cause rapid pulsations thereof when the rotor 40 is rotated and biomass is pumped into the chamber 16. Each pneumatic cylinder 70 includes a piston 74 that is actuated via air through air inlet 72. Each piston 74 pushes against the bed plate 30 when the pneumatic cylinder is pressurized with air. The illustrated fractionation apparatus 10 also includes a bed plate stop adjustment 76 that is utilized to set the distance the bed plate 30 can move relative the rotor 40.

Figure 9:
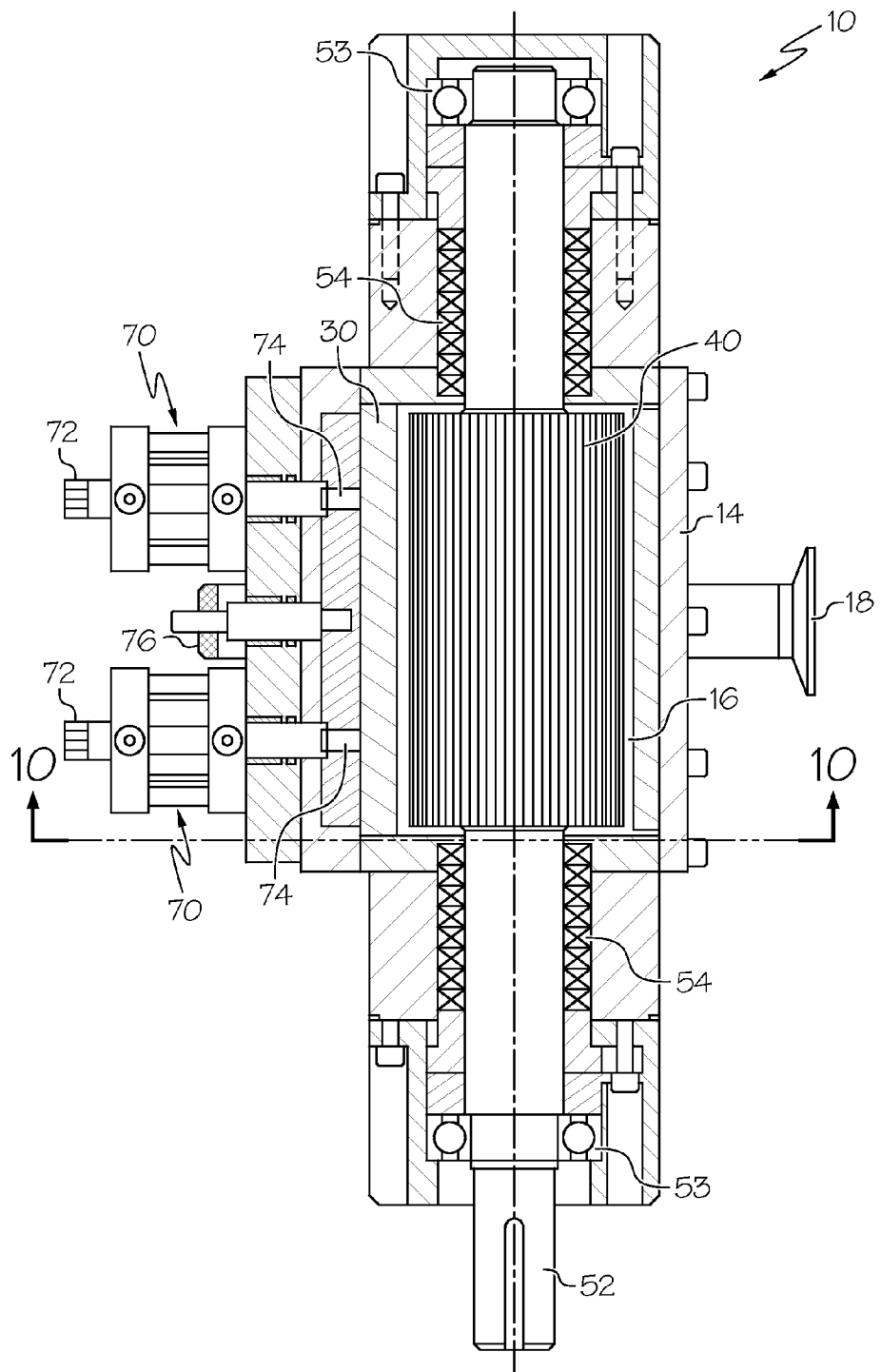
FIG. 9 is a top, cutaway view of a biomass fractionation apparatus, according to some embodiments of the present invention.

The fractionation apparatus 10 illustrated in FIGS. 9 and 10 is configured such that the bed plate 30 is positioned to one side of the rotor 40 (as opposed to beneath the rotor 40, as is the case with the embodiment illustrated in FIGS. 1-4). In addition, the inlet 18 and outlet 20 are located on the opposite side of the rotor 40, as illustrated.

FIG. 11 illustrates a fractionation apparatus 10 according to other embodiments of the present invention and wherein the bed plate 30 is positioned above the rotor 40, and the inlet 18 and outlet 20 are located on the opposite side of the rotor 40 (i.e., beneath the rotor 40), as illustrated.

In each of the embodiments illustrated in FIGS. 10 and 11, a mid feather 17 is positioned within the processing chamber 16. The mid feather 17 is an elongated member that reduces the ability of a biomass to bypass the bed plate 30 and flow directly from the inlet 18 to the outlet 20. The rotational direction of the rotor 40 in each embodiment is illustrated by arrow R. The mid feather 17 in each embodiment thereby helps direct the biomass around the rotor 40 in the direction of rotation R.

Figure 8A:
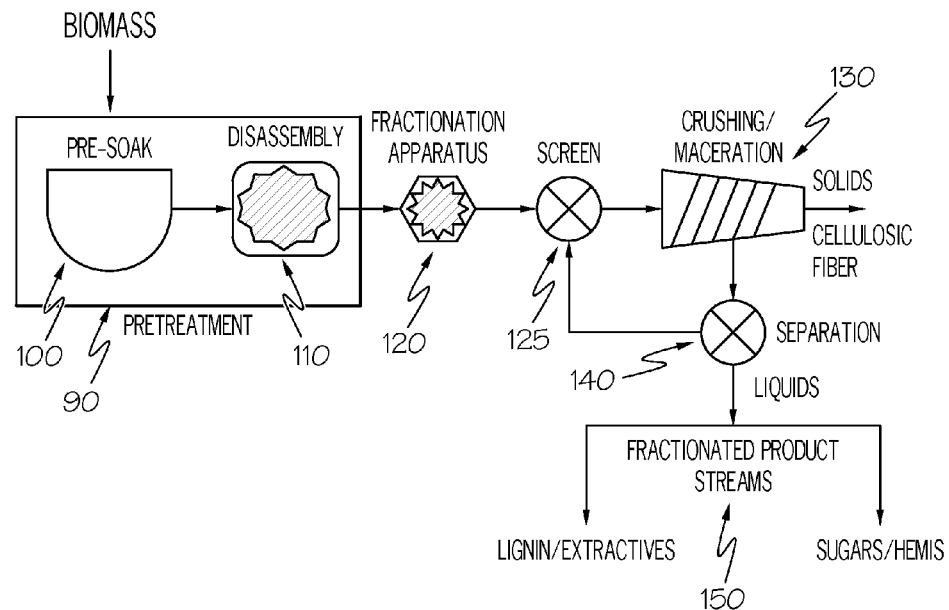
FIGS. 8A-8B are flowcharts of operations for fractionation and extraction of biomass, according to some embodiments of the present invention.

Referring now to FIG. 8A, operations for the fractionation and extraction of various biomasses, according to some embodiments of the present invention, will be described. At ambient temperature, and optionally while in contact with a solvent, a pretreatment step (Block 90) may be conducted. The biomass may be subjected to a pre-soak step (Block 100) and/or a disassembly step (Block 110) in which the fibers are mechanically disassembled, followed by being subjected to high frequency pulses and high shear forces (Block 120) to fractionate or extract the biomass via the biomass fractionation apparatus 10 of FIG. 1-7 or 9-11. The fractionated or extracted biomass may then be subjected to filtration (Block 125), followed by a compression force (Block 130), and then followed by additional filtration and/or separation (Block 140). The fractions then may be used to provide a desired product stream (Block 150). It is noted that an initial fraction or extraction product may be collected at earlier points of the method and such previously collected fraction combined with the fraction or extract product stream.

In the initial pre-soak step (Block 100) of the pretreatment step (Block 90), the biomass may be contacted with a solvent such as with an alcohol, an aqueous alcohol, water or glycerin or co-solvent or mixture thereof in order to begin the fractionation or extraction of the biomass. The biomass may swell during this pretreatment step (Block 100). The biomass may be disassembled (Block 110) such as by chopping, cutting, attrition, or crushing prior to extraction. In a particular embodiment, if the biomass is, for example, fresh plant biomass or herbal plant material, the material may be extracted with alcohol. If the biomass is dried plant biomass or herbal plant material, it may be extracted with an aqueous alcoholic solution. Aqueous alcoholic fractionation or extraction may be performed in aqueous alcohol at different concentrations. Suitable alcohols may be short chain alcohol, such as, but not limited to, methanol, ethanol, propanol, isopropanol, butanol and isobutanol. In a particular embodiment, the alcohol is ethanol. The alcohol may be a co-solvent mixture such as a mixture of an alcohol and water. The aqueous alcoholic solution may comprise from about 0-100% (v/v) alcohol. More particularly, the aqueous alcoholic solution may comprise from about 25-95% (v/v) alcohol. In a particular embodiment, the aqueous alcoholic solution is about 25% (v/v) or more alcohol. In another particular embodiment, the aqueous alcohol may be about 60% (v/v) alcohol. In another embodiment, the aqueous alcoholic solution may be about 70% (v/v) alcohol. In yet another embodiment, the aqueous alcoholic solution may be about 86% or more (v/v) alcohol. In yet other embodiments, the process for fractionating or extracting biomass may comprise contacting the biomass with glycerin or an aqueous glycerin solution. In yet another embodiment, the process for extracting biomass may comprise contacting the biomass with water. Typically, in other embodiments of the invention, the ratio of biomass/solids contacted with a solvent/liquids used may be about 1:1 to 1:10 of solids to liquid.

Embodiments of the present invention are not limited to a pretreatment step involving a solvent. In some embodiments, fibers can be caused to "open up" without the use of a solvent by cutting, fraying, refining via various devices and in a dry condition.

In some embodiments, the pretreatment step (Block 90) may take place for any period of time that is sufficient for the fractionation or extraction process and may take place in any vessel, container or mixer suitable for contacting the biomass with a solvent. In some embodiments, the pretreatment step may be any length of time between, for example, 15 minutes, 30 minutes, 1 hour, 24 hours, 72 hours, etc. In another embodiment, the pretreatment step may be 15 minutes or less. The pretreatment step (Block 90) may be one minute or less. In the pretreatment step (Block 90), the biomass in contact with the solvent may optionally be subjected to a compressive force, which can result in absorption of the solvent into the biomass. The compression in the pretreatment step (Block 90) may take place according to any technique that will be appreciated by one of skill in the art. In an embodiment of the invention, compression during the pretreatment step may be affected by a screw press. However, as discussed above, the pretreatment step (Block 90) does not require the use of a solvent.

The biomass, after being subjected to pre-soaking in solvent (Block 100), may be further subjected to a disassembly step (Block 110). The material may be disassembled such as by processing in a mechanical high consistency fluidization machine such as a refiner or disk mill available from, for example, Sprout Waldron, Beloit Jones, and Andritz. By utilizing a refiner or disk mill, the biomass and particularly the fibrous material thereof may be altered without destroying the fibrous nature of the fibrous material so that the high frequency pulses and shear forces of the fractionation apparatus are accessible to the fibrous material. The processing may take place for any amount of time necessary as would be understood by one of skill in the art as necessary to affect this step. In a particular embodiment, the disassembly process is performed for one minute or less. The biomass may be subjected to additional compression in the presence of a solvent. Alternatively, the biomass may be subjected to centrifugation or the like to separate the liquid fraction from the solid fraction.

Following disassembly of the fibers (Block 110), the material may be subjected to fractionation (Block 120) using high frequency pulses and shear forces, for example via the apparatus 10 of FIG. 1-7 or 9-11, to fractionate or extract the biomass using shear forces and high frequency pulses. It will be appreciated that in a particular embodiment, pulsation and shear forces are used to avoid denaturing or altering the chemical properties of the individual components. Because the biomass may be in a fluidized form, a portion of the fractions or extracts may be separated from the biomass. The subjecting of the biomass shear forces and to high frequency pulses (Block 120) may take place for any amount of time necessary as would be appreciated by one of skill in the art as necessary to affect this step. In a particular embodiment, subjecting the biomass to shear forces and high frequency pulses (Block 120) takes place for one minute or less. In operation, the biomass is rapidly accelerated from about 4 mph to about 120 mph under greater than 1000 pulses per second of energy while avoiding fragmentation or attrition of the biomass particles. This facilitates the ability of the cellular structure of the biomass to release its various fractions or constituents from the complex and entangled structure of the biomass without substantially denaturing or altering any of the biomass components and the chemistry thereof.

The biomass material may then be subjected to a filtration or separation step with or without agitation (Block 125) and then to a compression force (Block 130) e.g., a crushing or macerating force, optionally in the presence of a solvent, wherein the compression force removes liquid for collection while discharging a low liquid solids cake. The compression force can be applied according to various techniques, as would be understood by one of skill in the art. In a particular embodiment, the compression force is affected by screws of a screw press that macerate the previously extracted biomass. A second fraction or extract separated from the previously fractionated or extracted biomass may be provided from this compression step. In another embodiment of the invention, the biomass contacted with additional solvent subjected to a compression force may be subjected again to compression to provide the second extract. The compression of this step may take place for any amount of time necessary as would be appreciated by one of skill in the art as necessary to affect this step.

At this time, the first fraction or extract from the previous steps may be combined and filtered (Block 140) to remove any remaining fibers. The filtering/screening of the extracts may be performed by any method known to one of skill in the art with any device that is suitable for filtering and removing any remaining solid matter from the extract and may include agitation. The fractions or extracts provided from the process according to some embodiments of the present invention may be used to provide a desired fraction or extractive product stream (Block 150). The product stream provided will be dependent upon the solvent used in the fractionation or extraction process. For example, in an embodiment of the invention, fractionation or extraction of lignins or medicinals may be provided if the solvent is ethanol or aqueous ethanol. In another embodiment, fractionation or extraction of sugars or hemicelluloses may be provided if the solvent is water. The fractions or extracts may be further separated isolated or purified using membranes, centrifugation, precipitation and the like. In one embodiment, membranes that separate components based on molecular weight may be used.

Figure 8B:
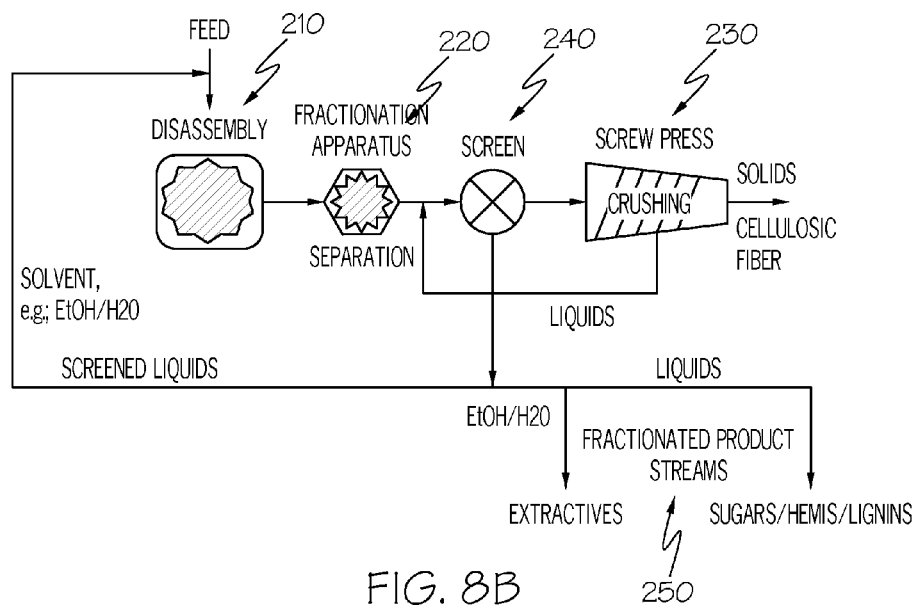

Referring now to FIG. 8B, operations for the fractionation and extraction of various biomasses, according to some embodiments of the present invention, will be described. The biomass, for example, herbal material, is subjected to an activation step which may include an additional disassembly step (e.g., maceration) (Block 210) followed by being subjected to high frequency pulses (Block 220) to fractionate or extract the biomass using high shear forces and high frequency pulses via the biomass fractionation apparatus 10 of FIGS. 1-7 and 9-11. The fractionated or extracted biomass may then be filtered via one or more screens (Block 240) and then subjected to crushing (Block 230), for example, via a screw press. The fractions or extracts then may be used to provide a desired product stream (Block 250). It is noted that an initial fraction or extraction product may be collected at earlier points of the method and such previously collected fraction combined with the fraction or extract product stream. Also, the screened liquids may either be recirculated through the screen (Block 240) or may be used again in the activation step (Block 210).

The separated, isolated or purified individual components may be used in a wide variety of ways. Lignin provided in accordance with embodiments of the present invention may be used in the preparation of products such as coatings and adhesives. In a further embodiment, fractionation or extraction provides sugars and/or hemicelluloses. Sugars, cellulose and/or hemicelluloses provided in accordance with embodiments of the present invention may further be used in the preparation of biofuels such as ethanol or the preparation of polymers/plastics. The fraction may be used as a feedstock to provide additional products or used directly. For example, another embodiment is the fermentation of the provided fractions to produce the ethanol. In another embodiment, the polymer is polylactic acid (PLA). In another embodiment the lignin may be further separated for further processing. Because the lignin has not been submitted to high temperatures, its functional groups have not chemically reacted and the isolated lignin may be more reactive. In an embodiment, the further refining and processing may provide pulp (cellulose) suitable for paper products and/or paper coatings. In yet another embodiment, the fractions or extractives provided may be used in paint additives. In yet another particular embodiment, the biomass is herbal plant material. The herbal plant material for extraction is provided in the form of whole leaf, stem, stalk, root and the like, and is ground or cut prior to treatment. The herbal plant material may be organic, cultivated, or wild. Suitable herbal plant materials include, but are not limited to, kava kava, echinacea, St. John's wort, valerian root, milk thistle seed, Siberian ginseng, nettle leaf, ginkgo, gotu kola, ginkgo/gotu kola supreme, astragalus, goldenseal, dong quai, ginseng, St. John's wort supreme, echinacea/goldenseal supreme, bilberry, green tea, hawthorne, ginger, turmeric, black cohosh, cats claw, chamomile, dandelion, chaste tree berry, feverfew, garlic, horse chestnut, licorice, eyebright, yohimbe, astragalus supreme, valerian poppy supreme, and serenity elixir. In some embodiments of the present invention, herbal plant material or teas may be extracted at ambient temperature without heating.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A method for fractionating biomass, the method comprising:
   pretreating a biomass to produce a fluidized biomass; and
   subjecting the fluidized biomass to shear forces and pulses within a processing chamber to produce a first fraction and a fractionated biomass, wherein the processing chamber includes a cylindrical rotor having a plurality of elongated blades extending radially outwardly therefrom in circumferentially spaced-apart relationship, and a bed plate movably positioned within the processing chamber adjacent to the rotor, wherein the bed plate includes a plurality of elongated fins extending outwardly therefrom in substantially parallel space-apart relationship, and wherein the rotor is rotated in a manner to accelerate the biomass against the fins of the bed plate and to cause the bed plate to pulsate against the rotor with the biomass there between while avoiding attrition of the biomass to cause the cellular structure of the biomass to release its components without denaturing or altering the chemistry of the biomass components.

2. The method of claim 1, wherein pretreating the biomass comprises contacting the biomass with a solvent.

3. The method of claim 1, further comprising:
   subjecting the fractionated biomass to a compression force while in contact with additional solvent to provide a second fraction separated from the previously fractionated biomass; and
   combining the first fraction and the second fraction together.

4. The method of claim 3, further comprising filtering the combination of the first fraction and the second fraction to remove any solid materials.

5. The method of claim 1, wherein each of the steps is conducted at ambient temperature.

6. The method of claim 2, wherein the solvent is selected from the group consisting of a short chain alcohol, glycerin and water, or a co-solvent mixture of any combination thereof.

7. The method of claim 2, wherein the solvent is ethanol or aqueous ethanol.

8. The method of claim 2, wherein the solvent is water.

9. The method of claim 1, wherein the biomass is subjected to pulsations of the bed plate against the rotor of at least 1000 pulses per second.

10. The method of claim 1, wherein the fraction comprises a component selected from the group consisting of lignin, extractives, cellulose, pectins, sugars, hemicellulose, proteins, fibers, and other components obtained from the leaves, stems, flowers, buds, roots, tubers, seeds, fruit and the like of a plant, or any combination thereof.

11. The method of claim 1, wherein the biomass is an herbal plant material.

12. The method of claim 11, wherein the herbal plant material is selected from the group consisting of kava kava, echinacea, St. John's wort, valerian root, milk thistle seed, Siberian ginseng, nettle leaf, ginkgo, gotu kola, astragalus, goldenseal, dong quai, ginseng, bilberry, green tea, hawthorne, ginger, turmeric, black cohosh, cats claw, chamomile, dandelion, chaste tree berry, feverfew, garlic, horse chestnut, licorice, eyebright, yohimbe, and valerian poppy.

* * * * *